United States Patent [19]

Muramatsu et al.

[11] Patent Number: 4,565,754
[45] Date of Patent: Jan. 21, 1986

[54] ELECTRODE FOR ORGANIC BATTERY

[75] Inventors: Hiromochi Muramatsu, Nagoya; Atsushi Watanabe, Toyokawa, both of Japan

[73] Assignee: Nippondenso Co., Ltd., Kariya, Japan

[21] Appl. No.: 621,923

[22] PCT Filed: Jul. 21, 1983

[86] PCT No.: PCT/JP83/00235
§ 371 Date: Jun. 13, 1984
§ 102(e) Date: Jun. 13, 1984

[87] PCT Pub. No.: WO84/02231
PCT Pub. Date: Jun. 7, 1984

[30] Foreign Application Priority Data

Nov. 26, 1982 [JP] Japan ................ 57-207340

[51] Int. Cl.⁴ .............................................. H01M 4/00
[52] U.S. Cl. .................................... 429/213; 429/194
[58] Field of Search .............. 429/213, 212, 232, 194, 429/218

[56] References Cited

U.S. PATENT DOCUMENTS 4,321,114 3/1982 MacDiarmid et al. ......... 429/213 X
4,375,427 3/1983 Miller et al. .................... 429/213 X
4,496,640 1/1985 Kobayashi et al. ................ 429/213

FOREIGN PATENT DOCUMENTS 50441 4/1982 European Pat. Off. ..
57-121168 7/1982 Japan .
57-123659 8/1982 Japan .
58-38743 3/1983 Japan .
58-38745 3/1983 Japan .
58-40781 3/1983 Japan .
58-42172 3/1983 Japan .
58-54553 3/1983 Japan .
1216549 12/1970 United Kingdom ................ 429/213

OTHER PUBLICATIONS

"Lightweight Rechargeable Storage Batteries Using Polyacetylene, (CH)x as the Cathode-Active Material", J. Electrochem. Soc.: Electrochemical Science and Technology, Aug. 1981, pp. 1651–1654.

Primary Examiner—Anthony Skapars
Attorney, Agent, or Firm—Cushman, Darby & Cushman

[57] ABSTRACT

An organic conductive material is used as an electrode 1 for an organic battery and a carbon material 2 is provided on its surface to partially expose the electrode 1 made of the organic conductive material. The carbon material 2 is constructed by a carbon layer formed by graphite powders with throughholes 4, or a mesh utilizing carbon fibers. By this construction, the degradation of the electrode 1 made of the organic conductive material is prevented, thus the decrease of output of the battery is prevented.

3 Claims, 2 Drawing Figures

1

ELECTRODE FOR ORGANIC BATTERY

TECHNICAL FIELD

The present invention relates to the construction of electrodes for organic batteries which utilize organic conductive material as the electrodes, and it is characteristic in the extension of the life of the electrodes achieved by covering the surfaces thereof with a layer or mesh consisting mainly of carbon.

BACKGROUND ART

The present invention relates particularly to the electrodes of organic batteries, although such organic batteries that utilize lithium perchlorate ($LiClO_4$) as an electrolyte and polyacetylene as electrodes are made available to the public at for example "Lightweight Rechargeable Storage Batteries Using Polyacetylene, (CH) x as the Cathode-Active Material" (Lightweight Rechargeable Storage Batteries Using Polyacetylene, (CH) x as the Anode-Active Material), P.1651-P.1654, in a column ELECTROCHEMICAL SCIENCE AND TECHNOLOGY (ELECTROCHEMICAL SCIENCE AND TECHNOLOGY) of J. Electrochem. Soc. (Journal of Electrochemical Society), August issue of Showa 56 (1981).

According to the investigations of the inventors, it was found that water remaining or mixing into the electrolyte affects the life of the battery. That is, it was found that in the organic battery utilizing an organic conductive material for the electrodes oxygen and hydrogen generated by the electrolysis of water remaining in the electrolyte react with the organic conductive material to decrease the conductivity thereof, thereby to decrease the output of the battery. When the organic conductive material is used for an anode of the organic battery, a hydroxyl ion ($OH^-$) generated by the electrolysis of the water at charging operation becomes an oxygen atom on the arrival thereof at the anode, and it reacts with the organic conductive material to decrease the conductivity of the organic conductive material, thus decreasing the output of the battery. On the other hand, a hydrogen ion ($H^+$) generated on the electrolysis of water at charging operation gathers around a cathode. Therefore, it reacts with the organic conductive material to decrease the conductivity likewise and then decrease the output from the battery.

DISCLOSURE OF INVENTION

Carbon has a nature to form carbonyl group ($=C=O$) when it reacts with an active oxygen. Therefore, if the surface of the anode made of organic conductive material is covered by carbon material, the hydroxyl ion ($OH^-$) generated on the electrolysis of water at charging operation reacts with the carbon material to form carbonyl group when it reaches the anode to become an oxygen atom. Further the carbonyl group thus formed makes carboxyl group (—COOH) when it further reacts with the hydroxyl ion. Therefore the organic electrode does not degrade, and the conductivity is maintained, thus preventing the decrease of the output from the battery. On the other hand in a cathode a hydrogen ion ($H^+$) generated by the electrolysis of water at charging operation gathers around the electrode. If the surface of the carbon material is partially oxidized in advance to form the carbonyl group, the carbonyl group reacts with the hydrogen ion to easily form aldehyde group (—CHO), thus the hydrogen ion generated does not react with the electrode made of organic conductive material but reacts with the carbon material. Therefore, the electrode does not degrade to maintain the conductivity, preventing the decrease of the output from the battery likewise.

Thus according to the present invention the surface of the electrode made of organic conductive material is partially covered by carbon material, therefore the degradation of the electrodes caused by oxygen and hydrogen generated by the electrolysis of water is prevented. At the same time, it becomes possible to completely and air-tightly enclose the battery because the oxygen and hydrogen generated by the electrolysis of water are both trapped at the surface of the carbon material.

BEST MODE OF CARRYING OUT THE INVENTION

Figure 1:
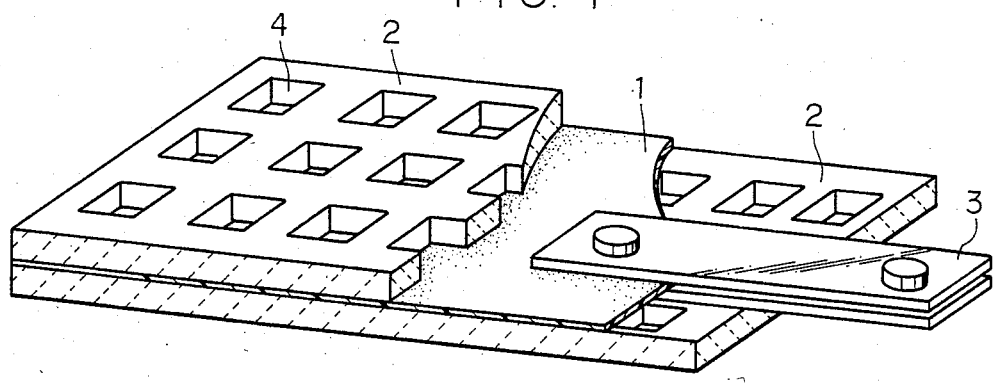
FIG. 1 shows a partially broken perspective view showing an example of the electrode of the organic battery of the present invention.

In FIG. 1 showing an embodiment of the structure of the electrode of the organic battery according to the present invention, 1 shows an electrode made of an organic conductive material. Concretely speaking, it is a film of polyacetylene of the thickness of 150μ for example. 2 shows a carbon material characteristic in the present invention, and is of a carbon layer with holes. These layers 2 are formed to encase the electrode 1. As the material for the carbon layer graphite particles of 0.025 mm in a particle diameter are used for example, and these particles are pressed hard by a pressure of about 1 ton to form the layer. For the shape thereof any desirable shapes are admissible as far as it encloses the electrode 1, and a flat layered structure of 3 mm (in this case there are formed small holes among the particles) is admissible, and as in the drawing it is permissible to provide through holes 4 at some portion of the layer to expose the electrode 1 therethrough. In the example of FIG. 1, the portion of the electrode 1 covered by the carbon material 2 is about 60%.

Figure 2:
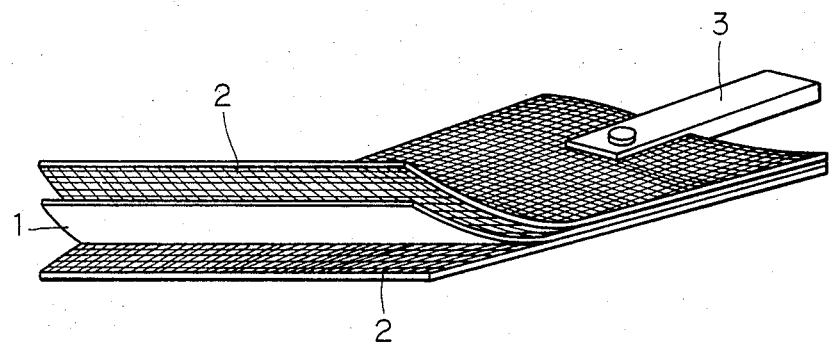
FIG. 2 shows a partially broken perspective view showing another example of the electrode of the organic battery of the present invention.

FIG. 2 shows a carbon material 2 of mesh structure using carbon fibers, and the mesh is structured by a bundle of carbon fibers which is woven to remain small distances to the next one. Here the bundle of carbon fibers is about 25μ in diameter and that is made by twining carbon fibers, each 4μ in diameter for example. Further, it is possible to make the mesh to remain a distance of about 5 mm between the neighboring bundles of carbon fibers. In the example of FIG. 2, the carbon material 2 of mesh structure covers about 70% of the electrode 1. In both figures, 3 shows a lead electrode, and a conductive material Ni is used therefor. It was connected with the electrode 1 by mechanical pressed contact. Further the electrode of this structure may be used as an anode or cathode, or both in the organic battery. Moreover, it is preferable to cover the electrode 1 by the carbon material 2 in the range of 30-70%, although it depends on the current needed and the life expected.

In the embodiment above described, polyacetylene is used as the organic conductive material, however other organic conductive materials such as polypyrrole and polyparaphenylene sulphide may be used.

Further in the embodiment above, carbon powders and carbon fibers are used as the material for the protector of the electrodes of the organic battery, it can be other materials which include these materials as main components. For example, it is admissible to mix the material with a filler of synthetic resin to facilitate the formation of the carbon layer.

Furthermore, in the embodiment above Ni is used for the lead electrode 3, however other conductive materials, for example Al, Pt, or carbon layer made from carbon powders and carbon fibers may be used as far as they are not corroded by the electrolyte.

EXAMPLE

To an electrode 1 made of a film of polyacetylene (10×20×0.15 mm) pressed a piece of Ni as a lead electrode 3, and a carbon layer 2 of 2.0 mm formed from graphite of 0.025 mm in particle diameter is formed on the surface of the organic electrode. In this case, there are formed as in FIG. 1 throughholes 4, 2 mm$^2$ on four sides, in the carbon layer 2, so that about 70% of the electrode 1 is covered. The two electrodes thus obtained are put into a container of glass via a separator made of polypropylene, and then it is sealed in a vacuum with a solvent of propylene carbonate of lithium perchlorate (LiClO$_4$), whose content is 1 mol/dm$^3$, to form the organic battery using the electrodes of the present invention. It was applied to a cycle of charging and discharging. The short circuit current was 80 mA/cm$^2$ at first, however it decreased rapidly to 24 mA/cm$^2$ at the tenth cycle when no carbon layer is provided, and thereafter it gradually decreased and it became impossible to take out output after 100 cycles.

On the contrary, when the carbon layer is provided, the short circuit current is maintained about 70 mA/cm$^2$ even after 100 cycles of charging and discharging. This means that the number of charging and discharging cycle increased 10 times as much as it was in the battery utilizing the electrode of the present invention by the provision of the carbon layer.

INDUSTRIAL APPLICABILITY

As described above, the organic electrodes of the present invention partly covered by the carbon material are useful to extend the life of the battery when they are used as the electrodes of the organic batteries.

We claim:

1. An electrode assembly for an organic battery comprising an electrode made from an organic conductive material, and a layer of carbon material covering about 30–70% of the surface of the electrode and having a plurality of holes therein so that about 70–30% of the surface of the electrode is exposed.

2. An electrode for an organic battery as recited in claim 1 wherein said layer of carbon material is a pressed powder of graphite, and is provided with a plurality of holes therethrough.

3. An electrode for an organic battery as recited in claim 1 wherein said layer of carbon material is a mesh of combined carbon fibers.

* * * * *